United States Patent [19]

Nomura et al.

[11] 4,401,715

[45] Aug. 30, 1983

[54] FIBER REINFORCED PLASTIC MOLDED ARTICLES AND PROCESS FOR THE PRODUCTION THEREOF

[75] Inventors: Isao Nomura; Masayoshi Hori, both of Toyama; Sotomi Goto; Hirokazu Kittaka, both of Sagamihara, all of Japan

[73] Assignee: Nitto Boseki Co., Ltd., Fukushima, Japan

[21] Appl. No.: 350,367

[22] Filed: Feb. 19, 1982

[30] Foreign Application Priority Data

Feb. 23, 1981 [JP] Japan .................................. 56-25117

[51] Int. Cl.³ ............................................. B32B 3/10
[52] U.S. Cl. .............................. 428/306.6; 428/313.3; 428/317.9
[58] Field of Search ............... 428/306.6, 307.3, 308.4, 428/313.3, 313.5, 313.7, 313.9, 317.9

[56] References Cited

U.S. PATENT DOCUMENTS

| 1,960,440 | 5/1934 | Hoevel | 428/317.9 |
| 3,325,341 | 6/1967 | Shannon | 428/313.9 |
| 3,900,648 | 8/1975 | Smith | 428/317.9 |
| 4,268,574 | 5/1981 | Peccenini et al. | 428/313.9 |

*Primary Examiner*—William J. Van Balen
*Attorney, Agent, or Firm*—Gerald J. Ferguson, Jr.; Joseph J. Baker

[57] ABSTRACT

A fiber reinforced plastic molded article containing a porous resin concrete plate as a reinforcing material and a process for the production thereof are described. The porous resin concrete plate is made of 100 parts by weight of a thermosetting resin, 20 to 50 parts by weight of inorganic or organic hollow beads, and 50 to 100 parts by weight of an inorganic fine powder. The fiber reinforced molded article is produced by placing a glass fiber substrate in a mold, mounting a porous resin concrete late on the glass fiber substrate at an area to be reinforced, covering the porous resin concrete plate with a glass fiber substrate, impregnating the glass fiber substrates with a molding resin, and molding.

1 Claim, 1 Drawing Figure

U.S. Patent    Aug. 30, 1983    4,401,715
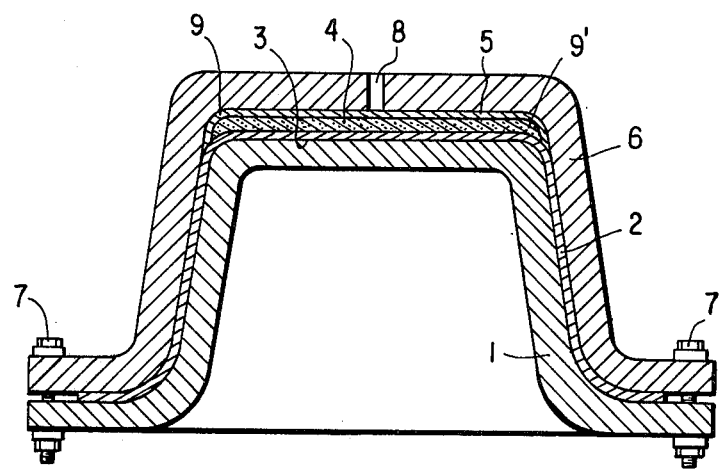

FIBER REINFORCED PLASTIC MOLDED ARTICLES AND PROCESS FOR THE PRODUCTION THEREOF

FIELD OF THE INVENTION

The present invention relates to fiber reinforced plastic (hereinafter referred to as "FRP") molded articles and a process for the production of the FRP molded articles. More particularly, it relates to FRP molded articles of high strength and light weight in which neither cracking nor ply-separation occurs between a reinforcing material and FRP, and a process for the production thereof.

BACKGROUND OF THE INVENTION

FRP molded articles are used as bath-tubs, hulls for small-sized ships, bodies for cars, and so forth because of high strength thereof. With these FRP molded articles, however, it is necessary to increase the amount of glass fiber being used for reinforcement at areas that are to be under heavy load, and furthermore, to increase the wall thickness at the areas. This naturally leads to an increase in production costs. Furthermore, since this results in the division of the molded article into a part where the wall thickness is large and a part where the wall thickness is small, which are different in thermal conductivity from each other, internal strains are produced in the molded article by the difference in rate of curing between the thick wall part and thin wall part during cure molding. These internal strains give rise to the problems that the molded article is deformed and unevenness is locally produced.

Therefore, at areas where reinforcement is particularly required, e.g., the bottom of a bath-tub and the bottom of a small-sized ship, a reinforcing material, e.g., a wooden plate and a resin concrete plate, is incorporated into the FRP molded article.

When a wooden plate is used as a reinforcing material, it is necessary to bore a number of holes in the wooden plate since the flow of a resin is hindered at both sides of the wooden plate in a mold. Furthermore, since the wooden plate contains a considerable amount of air in wood fibers, the air leaves the wooden plate at the step that a thermosetting resin is injected and cured, forming air bubbles in the thermosetting resin. In order to prevent the formation of air bubbles, in some cases, the whole surface of the wooden plate is previously coated with an unsaturated polyester resin. It is, however, very difficult to conduct such surface coating perfectly, and it is not possible to completely prevent the formation of air bubbles. Moreover, it suffers from the disadvantage that when load is applied repeatedly, cracks are formed between the wooden plate and FRP material (glass fiber plus molding resin), and ply-separation occurs therebetween.

In addition, the wooden plate has disadvantages in that it is seriously deformed by changes in temperature, humidity, etc., and in that it is, as described above, necessary to bore a number of holes in the wooden plate, and when the wooden plate is not placed at the correct position, it contacts with the surface of a mold, scratching and damaging the mold.

In order to overcome the above described defects of the wooden plate, it has been proposed to use a resin concrete plate in place of the wooden plate. The resin concrete plate is composed of 20% by weight or less of a thermosetting resin, 50 to 80% by weight of a fine aggregate, and 30% by weight or less of a super fine aggregate. It is used mainly in place of cement concrete, and has a specific gravity as high as about 2 (even for light weight resin, the specific gravity is 1 or more) and a modulus of elasticity as high as about 2,000 kg/mm$^2$, and is water-tight. The use of such a resin concrete plate as a reinforcing material for the FRP molded article undesirably increases the weight of the resulting molded article, deteriorates the fluidity of a thermosetting resin on the upper and lower surfaces of the resin concrete plate as in the case of the wooden plate, requires the formation of a number of holes in the plate as in the case of the wooden plate, and furthermore, produces cracks between the resin concrete plate and FRP material and causes ply-separation therebetween.

Japanese Patent Application (OPI) No. 155617/80 (the term "OPI" as used herein refers to a "published unexamined Japanese patent application") discloses an improved method in which after an FRP molded article is previously formed, a resin concrete plate is laminated thereon at an area to be reinforced, and the same material as for the FRP molded article is applied on the surface of the resin concrete plate to form an overlay layer. Even with the molded article produced in accordance with the method, however, cracks are produced between the FRP material and the resin concrete plate, and ply-separation occurs between the FRP material and resin concrete plate.

SUMMARY OF THE INVENTION

An object of the invention is to provide an FRP molded article of light weight and sufficient strength, which is free from the formation of cracks between the FRP material and a reinforcing material, ply-separation and so forth.

Another object of the invention is to provide an FRP molded article which is free from internal strains and has a smooth and even surface.

A further object of the invention is to provide a process for the production of such FRP molded articles.

It has been found that the objects are attained by using a porous resin concrete plate as a reinforcing material for the FRP molded article.

The present invention, therefore, provides:

(1) a fiber reinforced plastic molded article containing as a reinforcing material a porous resin concrete plate having the following composition:

|  | parts by weight |
| --- | --- |
| thermosetting resin | 100 |
| inorganic or organic hollow beads | 20–50 |
| inorganic fine powder | 50–100 | and (2) a process for producing a fiber reinforced plastic molded article which comprises placing a glass fiber substrate in a mold, mounting a porous resin concrete plate having the composition as shown above on the glass fiber substrate at an area to be reinforced, covering the porous resin concrete plate with the same glass fiber substrate as used above, impregnating the glass fiber substrates with a molding resin, and molding.

BRIEF DESCRIPTION OF THE DRAWING

The FIGURE is a cross-sectional view of a mold illustrating an embodiment of the process of the invention.

DETAILED DESCRIPTION OF THE INVENTION

The porous resin concrete plate as used herein is made of 100 parts by weight of a thermosetting resin, 20 to 50 parts by weight of inorganic or organic hollow beads, and 50 to 100 parts by weight of an inorganic fine powder. As the thermosetting resin, an unsaturated polyester resin is generally used although the invention is not limited thereto. In addition, various thermosetting resins such as an epoxy resin, a urethane resin and a phenol resin can be used.

The inorganic or organic hollow bead as used herein is a hollow spherical member, e.g., perlite, silace balloon, glass balloon, phenol balloon, or light weight burned aggregate. The optimum hollow bead has an apparent bulk specific gravity of 0.07 to 0.5, and completely passes through a JIS Z-8801 standard screen of 4.76 mm but is collected on a 0.59 mm screen.

The inorganic fine powder as used herein is a fine powder of calcium carbonate, clay silica sand and a silicate foamed substance, and the grain size is preferably about 100 to 200 mesh.

The porous resin concrete plate is produced, for example, as follows:

|  | parts by weight |
|---|---|
| Unsaturated polyester resin (Polylight PC151, produced by Dainippon Ink Manufacturing Co., Ltd.) | 100 |
| Perlite (FS, produced by Toho Perlite Co., Ltd.) | 25 |
| Calcium carbonate (NS-100, produced by Nitto Funka Kogyo K.K.) | 100 |
| Cobalt naphthenate (accelerator) | 0.5 |
| Methyl ethyl ketone peroxide (catalyst) | 1.0 |

These uncured ingredients are introduced into the desired mold, cured at ordinary temperature, and removed from the mold to provide a porous resin concrete plate.

The thus-prepared porous resin concrete plate contains a number of voids resulting from partial adhesion and bonding between hollow beads and inorganic fine powder with an unsaturated polyester resin, for example. In this state, the modulus of elasticity is low. When the porous resin concrete plate produced by curing at ordinary temperature is brittle because of poor adhesion and bonding with the thermosetting resin, if a glass fiber substrate, such as chopped strand mat or roving cloth, is previously placed in a mold and the above described uncured ingredients are introduced thereinto, there can be obtained a porous resin concrete plate having no brittleness. The glass fiber substrate may be provided on both sides of the porous resin concrete plate at the production thereof.

The porous resin concrete plate is of light weight, that is, has a specific gravity of 1.0 or less. As such, the modulus of elasticity is low to such an extent that deformation readily occurs upon application of heavy load. Furthermore, since a number of voids which are connected each other from one side to the other side through the thickness of the plate are formed in the plate, a viscous fluid such as a molding resin can easily move passing through the voids.

The FIGURE is a cross-sectional view illustrating the production of a bath-tub containing the above described porous resin concrete plate as a reinforcing material.

The invention is hereinafter explained with reference to the drawing. Referring to the FIGURE, a glass fiber substrate 2 of preformed chopped strand mat, roving cloth or a combination thereof is mounted on the surface of a lower half mold 1 after the coating of the lower half mold 1 with a releasing agent (if necessary, gel coating can be applied).

A porous resin concrete plate 4 as described above is then mounted on the glass fiber substrate 2 at an area 3 to be reinforced (corresponding to the bottom of the bath-tub). The porous resin concrete plate 4 is covered with a glass fiber substrate 5 for an overlay, which is the same as the glass fiber substrate 2. Thereafter, an upper half mold 6 is placed, and the lower half mold 1 and upper half mold 6 are cramped with clamping bolts 7 and 7.

After the clamping is completed, a predetermined amount of a molding resin containing an accelerator and a catalyst is introduced through an injection hole 8 of the upper half mold 6 at an injection pressure of about 5 kg/cm² for a period of about 3 to 5 minutes, is cured by allowing to stand at ordinary temperature for about 40 minutes, and thereafter the lower half mold 1 and upper half mold 6 are separated from each other to remove a molded article therefrom.

As the molding resin as used herein, an unsaturated polyester resin, an epoxy resin, a urethane resin, and so forth can be used. In view of workability and cost, an unsaturated polyester resin is preferred. As the accelerator, it is preferred to use cobalt naphthenate. In addition, dimethylaniline, cobalt octenate, etc., can be used. The amount of the accelerator used is from 0.3 to 1.0 part by weight per 100 parts by weight of a molding resin. As the catalyst, acetylacetone peroxide is usually used. In addition, benzoyl peroxide, methyl ethyl ketone peroxide, etc., can be used. The amount of the catalyst used is from 0.5 to 2.0 parts by weight per 100 parts by weight of a molding resin.

Since the porous resin concrete plate as used herein as a reinforcing material has a low modulus of elasticity, when the lower half mold 1 and upper half mold 6 are cramped, the plate can be easily deformed to confirm to the mold even if it is positioned slightly apart or deviated from the predetermined position. In accordance with the invention, therefore, the damage of a mold encountered in placing the conventional wooden plate or resin concrete plate slightly apart from the predetermined position can be completely avoided and, thus, handling is simplified.

Furthermore, since the porous resin concrete plate 4 is made so as to contain a number of voids, when the molding resin is introduced under pressure through the injection hole 8 of the upper half mold 6, the glass fiber substrate 5 for an overlay is once impregnated with the molding resin. A part of the molding resin moves rapidly to the glass fiber substrate 2 from the glass fiber substrate 5 through the ends 9 and 9' thereof, and, thus, the glass fiber substrate 2 is rapidly impregnated with the molding resin. Another part of the molding resin passes through a number of voids in the porous resin concrete plate 4 and reaches the glass fiber substrate 2 at the area positioned below the porous resin concrete plate 4, which is thus rapidly impregnated with the molding resin. In particular, since the thermosetting resin for use in the preparation of the porous resin concrete plate as used herein has good drape with the molding resin for the preparation of the FRP molded article, the molding resin can rapidly pass through the porous resin concrete plate 2. In accordance with the process of the invention, the molding resin can be introduced rapidly and uniformly throughout the inside of the mold as in the case that a reinforcing material is not used.

The FRP molded article produced by the process of the invention is, of course, of light weight compared with those articles with the conventional wooden plate or resin concrete plate incorporated thereinto. Furthermore, the FRP molded article exhibits a high strength similar to those of the conventional FRP molded articles.

Furthermore, with the FRP molded article of the invention, any cracks are not formed between the porous resin concrete plate and FRP material, and any ply-separation does not occur therebetween since the molding resin passes through a number of voids in the porous resin concrete plate as a reinforcing material, reaching the opposite glass fiber substrate, and is cured in that state, bonding together the porous resin concrete plate and glass fiber substrates.

Since the porous resin concrete plate is secured by the curing and bonding of the molding resin in a number of voids formed therein, there is almost no difference in the thickness of the molding resin between the area where the porous resin concrete plate is introduced and the area where it is not introduced. Therefore, there is almost no difference in thermal conductivity resulting from the difference in the thickness of the molding resin between the areas. Thus, the formation of internal strains does not almost occur, which is encountered in the conventional FRP molded article by the difference in rate of curing between the two areas, and there can be obtained an FRP molded article which is free from defects such as deformation and unevenness.

When the amount of the inorganic or organic hollow beads used is less than 20 parts by weight per 100 parts by weight of the thermosetting resin, the amount of voids is reduced and the molding resin cannot sufficiently penetrate into the interior of the porous resin concrete plate, whereas when the amount is more than 50 parts by weight, voids are formed excessively and the porous resin concrete plate thus formed cannot maintain a sufficient strength as a reinforcing material. Therefore, the amount of inorganic or organic hollow beads being compounded is preferably from 20 to 50 parts by weight per 100 parts by weight of the thermosetting resin.

When the amount of the inorganic fine powder added is less than 50 parts by weight per 100 parts by weight of the thermosetting resin, the porous resin concrete plate thus formed cannot exhibit a sufficient strength to be used as a reinforcing material, whereas the amount is more than 100 parts by weight, the penetration of the molding resin is undesirably prevented. Therefore, the amount of inorganic fine powder being compounded is preferably from 50 to 100 parts by weight per 100 parts by weight of the thermosetting resin.

Since the porous resin concrete plate as used herein is produced by a simplified procedure, i.e., by placing necessary materials in a desired mold and curing at ordinary temperature, there can be obtained various advantages. For example, the shape of the porous resin concrete plate is not limited to a flat one, and those having complicated shapes, e.g., those with reinforcing ribs, can be simply produced. Furthermore, mass production of porous resin concrete plates having high dimensional accuracy and a predetermined quality is made possible. Therefore, these porous resin concrete plates can be used as reinforcing materials for various FRP molded articles.

It is advantageous to laminate a glass fiber substrate on the porous resin concrete plate since when the resulting laminate is used as a reinforcing material for an FRP molded article, the glass fiber substrate also functions as a reinforcing material for the FRP molded article.

Although the FIGURE shows a process for the production of an FRP molded article by injection molding, the invention is not limited thereto, and other various molding techniques such as a pressure molding method and a hand lay-up method can be used.

In accordance with the process of the invention, there can be produced an FRP molded article in which a porous resin concrete plate is used at an area to be reinforced, and the impregnation of fiber substrates with a molding resin in a mold can be conducted rapidly and uniformly as in the case that no reinforcing material is introduced. Furthermore, since the process of the invention does not require any technique to bore a number of holes in the porous resin concrete plate, which is required for the conventional wooden plate or resin concrete plate, the method of production is simplified and production costs can be reduced.

The FRP molded article of the invention is of light weight and has a sufficient strength compared with the conventional FRP molded articles. Furthermore, the formation of cracks between the porous resin concrete plate as a reinforcing material and FRP material and the ply-separation therebetween do not occur at all. Thus, an FRP molded article can be produced inexpensively, which is free from deformation due to internal strains and surface unevenness.

While the invention has been described in detail and with reference to specific embodiments thereof, it will be apparent to one skilled in the art that various changes and modifications can be made therein without departing from the spirit and scope thereof.

What is claimed is:

1. A fiber reinforced plastic molded article containing as a reinforcing material a porous resin concrete plate comprising 100 parts by weight of a thermosetting resin, 20 to 50 parts by weight of inorganic or organic hollow beads, and 50 to 100 parts by weight of an inorganic fine powder.

* * * * *